United States Patent
Nakai et al.

(10) Patent No.: US 9,127,117 B2
(45) Date of Patent: Sep. 8, 2015

(54) METHOD FOR PRODUCING POLYAMIDE RESIN

(75) Inventors: Makoto Nakai, Kyoto (JP); Mariko Morimoto, Kyoto (JP)

(73) Assignee: UNITIKA LTD., Hyogo (JP)

( * ) Notice: Subject to any disclaimer, the term of this patent is extended or adjusted under 35 U.S.C. 154(b) by 86 days.

(21) Appl. No.: 13/984,870

(22) PCT Filed: Feb. 29, 2012

(86) PCT No.: PCT/JP2012/055016
§ 371 (c)(1),
(2), (4) Date: Aug. 12, 2013

(87) PCT Pub. No.: WO2012/118107
PCT Pub. Date: Sep. 7, 2012

(65) Prior Publication Data
US 2013/0338333 A1 Dec. 19, 2013

(30) Foreign Application Priority Data

Mar. 2, 2011 (JP) ................................. 2011-045196

(51) Int. Cl.
*C08G 69/26* (2006.01)
*C08G 69/04* (2006.01)
*C08L 77/06* (2006.01)
*C08L 77/10* (2006.01)
*C08L 77/00* (2006.01)
*C08G 69/28* (2006.01)

(52) U.S. Cl.
CPC ............... *C08G 69/04* (2013.01); *C08G 69/26* (2013.01); *C08G 69/28* (2013.01); *C08L 77/00* (2013.01); *C08L 77/06* (2013.01); *C08L 77/10* (2013.01)

(58) Field of Classification Search
CPC ......... C08L 77/06; C08L 77/00; C08L 77/10; C08G 69/26; C08G 69/30
USPC ................................... 524/606; 528/310, 335
See application file for complete search history.

(56) References Cited

U.S. PATENT DOCUMENTS

2011/0144300 A1    6/2011  Desbois et al.
2011/0206881 A1*   8/2011  Briffaud et al. ............ 428/36.91

FOREIGN PATENT DOCUMENTS

| JP | 2002-220464 | 8/2002 |
| JP | 2002-220466 | 8/2002 |
| JP | 2002-293926 | * 10/2002 |
| WO | 2010/018220 | 2/2010 |

OTHER PUBLICATIONS

Extended European Search Report in corresponding European Patent Application No. 12752128.4, dated Oct. 7, 2014.
English language abstract and machine translation for JP 2002-220464.
English language abstract and machine translation for JP 2002-220466.

* cited by examiner

*Primary Examiner* — Gregory Listvoyb
(74) *Attorney, Agent, or Firm* — Fildes & Outland, P.C.

(57) ABSTRACT

The present invention is a method for producing a polyamide resin, wherein a nylon salt obtained from a dicarboxylic acid and a diamine having a boiling point exceeding 100° C. is heated to be polymerized under normal pressure while water vapor is being allowed to be present in the polymerization reaction system.

2 Claims, No Drawings

METHOD FOR PRODUCING POLYAMIDE RESIN

TECHNICAL FIELD

The present invention relates to a method for producing a polyamide resin.

BACKGROUND ART

Polyamide resins produced from a diamine and a dicarboxylic acid as a starting material are widely used in various fields. As a method for producing such a polyamide resin, common is a method in which first a nylon salt (polyamide salt) is prepared by using a diamine and a dicarboxylic acid, and the resulting nylon salt is polymerized under pressurized conditions.

However, when a nylon salt is polymerized under pressurized conditions to produce a polyamide resin, it takes a relatively long time for a practical molecular weight to be achieved. Consequently, a triamine, a by-product, is produced in the polyamide resin, to be a cause for gelation. Further, when the nylon salt is polymerized under pressurized conditions, the apparatus used for the polymerization is required to be of a pressurization type. Accordingly, disadvantageously the introduction of a pressurization-type apparatus, and the operation and maintenance of the apparatus increase the costs involved.

For the purpose of solving such a problem as described above, the polymerization of the nylon salt under normal pressure has been investigated. For example, JPH03-243623A describes a preparation of a polyamide resin by polymerizing under normal pressure a nylon salt obtained from equimolar amounts of 1,12-diaminododecane and a dicarboxylic acid.

However, the production method of JPH03-243623A is a production method restricted to the polymerization of the nylon salt prepared from a dicarboxylic acid and 1,12-diaminododecane, and is a technique feasible because of the boiling point of 1,12-diaminododecane as high as 304° C. On the contrary, when a nylon salt obtained from a dicarboxylic acid and a diamine having a boiling point of 300° C. or lower is polymerized by the technique described in JPH03-243623A, the diamine is volatilized from the reaction system, and the molar balance between the diamine and the dicarboxylic acid included in the nylon salt is lost. Consequently, the obtained polyamide resin does not attain the achievement of a high molecular weight, and is unsuitable for practical use.

SUMMARY OF INVENTION

Technical Problem

In view of such a problem as described above, the problem to be solved by the present invention is to provide a method capable of producing a polyamide resin, being reduced in the occurrence of by-products and having a high molecular weight.

Solution to Problem

The present inventors made a diligent study for the purpose of solving such a problem to be solved. Consequently, the present inventors have reached the present invention by discovering that by polymerizing a nylon salt while the nylon salt is heated under normal pressure while water vapor is being allowed to be present in the polymerization reaction system and simultaneously water is being distilled outside the reaction system, the polymerization time is reduced to reduce by-products, and additionally a polyamide resin having a high molecular weight is obtained.

Specifically, the gist of the present invention is as follows.

(1) A method for producing a polyamide resin wherein a nylon salt obtained from a dicarboxylic acid and a diamine having a boiling point exceeding 100° C. is heated under normal pressure while water vapor is being allowed to be present in the reaction system.

(2) The method for producing a polyamide resin according to (1), wherein at the start of the heating, 0.5 to 10 parts by mass of water in relation to 100 parts by mass of the nylon salt is allowed to be present beforehand in the reaction system.

(3) The method for producing a polyamide resin according to (1), wherein at the start of the heating, water vapor is made to flow in the reaction system.

(4) The method for producing a polyamide resin according to any one of (1) to (3), wherein as the diamine, at least one selected from 1,10-diaminodecane, 1,11-diaminoundecane and 1,12-diaminododecane is used.

(5) The method for producing a polyamide resin according to any one of (1) to (4), wherein during the heating, the diamine is not distilled outside the reaction system.

(6) The method for producing a polyamide resin according to any one of claims (1) to (5), wherein water is distilled outside the reaction system while water is being refluxed into the reaction system.

Advantageous Effects of Invention

According to the production method of the present invention, as compared to the case where the nylon salt is polymerized under pressurized conditions, the polymerization time is reduced by polymerizing the nylon salt under normal pressure, and a polyamide resin having a smaller amount of the triamine, a by-product, namely, a polyamide resin suppressed in gelation can be obtained. Additionally, because of performing the polymerization under normal pressure, no pressurization-type apparatus is required, and the cost for the introduction of a pressurization-type apparatus and the cost for the operation and maintenance of the apparatus are reduced.

Yet additionally, because of performing the polymerization by using a diamine having a boiling point exceeding 100° C. while water vapor is being allowed to be present in the reaction system, the distillation of the diamine included in the nylon salt outside the reaction system during the polymerization reaction can be suppressed. Consequently, the molar balance between the dicarboxylic acid and the diamine included in the nylon salt can be maintained, and hence a polyamide resin having a high molecular weight can be obtained.

Also, in the case where the polymerization is performed while water is being distilled outside the reaction system while water is being refluxed into the reaction system, the reaction decomposing the produced polyamide resin to produce the dicarboxylic acid and the diamine can be more suppressed, and hence the polymerization reaction to produce the polyamide resin can be further promoted.

DESCRIPTION OF EMBODIMENTS

Hereinafter, the present invention is described in detail. In the method for producing a polyamide resin of the present invention, a nylon salt obtained from a dicarboxylic acid and a diamine having a boiling point exceeding 100° C. is heated under normal pressure while water vapor is being allowed to be present in the reaction system.

Examples of the dicarboxylic acid for obtaining the nylon salt used in the production method of the present invention include aliphatic dicarboxylic acids, alicyclic dicarboxylic acids and aromatic dicarboxylic acids. Examples of the aliphatic dicarboxylic acid include: oxalic acid, malonic acid, succinic acid, glutaric acid, adipic acid, pimelic acid, suberic acid, azelaic acid, sebacic acid, undecanedioic acid and dodecanedioic acid. Examples of the alicyclic dicarboxylic acid include cyclohexanedicarboxylic acid. Examples of the aromatic dicarboxylic acid include phthalic acid, terephthalic acid, isophthalic acid and naphthalenedicarboxylic acid. Among these, from the viewpoint of versatility, terephthalic acid, isophthalic acid and adipic acid are preferable as the dicarboxylic acid.

In the nylon salt, the proportion of the total amount of terephthalic acid, isophthalic acid and adipic acid in relation to the total amount of the dicarboxylic acid component is preferably 70 mol % or more and more preferably 90 mol % or more.

The diamine for obtaining the nylon salt used in the production method of the present invention is required to be a diamine having a boiling point exceeding 100° C., is preferably a diamine having a boiling point exceeding 150° C. and is more preferably a diamine having a boiling point exceeding 200° C. The use of the diamine having a boiling point exceeding 100° C. precludes, during the reaction to polymerize the nylon salt, the distillation of the diamine outside the reaction system as a result of the volatilization of the diamine in preference to water, and also precludes the loss of the molar balance between the dicarboxylic acid and the diamine. Consequently, the polyamide resin allowed to achieve a high molecular weight can be obtained. The larger the difference in boiling point between water and the diamine (namely, the higher the boiling point of the diamine), the more the distillation of only the diamine outside the reaction system is suppressed, and hence only water can be easily distilled outside the reaction system.

Examples of the diamine having a boiling point exceeding 100° C. include the following: 1,2-diaminoethane (boiling point: 117° C.), 1,3-diaminopropane (boiling point: 140° C.), 1,4-diaminobutane (boiling point: 159° C.), 1,5-diaminopentane (boiling point: 179° C.), 1,6-diaminohexane (boiling point: 204° C.), 1,7-diaminoheptane (boiling point: 224° C.), 1,8-diaminooctane (boiling point: 240° C.), 1,9-diaminononane (boiling point: 258° C.), 1,10-diaminodecane (boiling point: 271° C.), 1,11-diaminoundecane (boiling point: 282° C.), 1,12-diaminododecane (boiling point: 304° C.), 1,4-cyclohexanediamine (boiling point: 197° C.), o-phenylenediamine (boiling point: 284° C.), m-phenylenediamine (boiling point: 283° C.), p-phenylenediamine (boiling point: 267° C.), p-xylylenediamine (boiling point: 262° C.) and m-xylylenediamine (boiling point: 248° C.). Among these, from the viewpoint of increasing the difference in boiling point between water and the diamine, 1,10-diaminodecane, 1,11-diaminoundecane and 1,12-diaminododecane are preferable.

Examples of the polyamide resin obtained by combining such monomers (a dicarboxylic acid and a diamine) as described above include polyamide 6T, polyamide 9T, polyamide 10T, polyamide 6I, polyamide 9I, polyamide 10I, polyamide 46, polyamide 66 and polyamide 610. Here, T represents terephthalic acid, and I represents isophthalic acid.

The method for obtaining a nylon salt from a dicarboxylic acid and a diamine is not particularly limited, and heretofore known methods for obtaining such a nylon salt can be adopted. For example, an aqueous solution method, a liquid method and a solid method may be quoted.

The aqueous solution method is a method for obtaining a nylon salt by preparing an aqueous solution including a dicarboxylic acid, a diamine and water, allowing the dicarboxylic acid and the diamine to react with each other in the aqueous solution, and then cooling the aqueous solution. This method is one of the most common methods for obtaining a nylon salt.

The amount of water used in the aqueous solution method is not particularly limited; however, from the viewpoint of productivity, the amount of water used in the aqueous solution method is preferably set at 5000 parts by mass or less and more preferably 900 parts by mass or less in relation to 100 parts by mass of the total amount of the dicarboxylic acid and the diamine.

Additionally, from the viewpoint of the solubility of the salt, the reaction temperature in the aqueous solution method is preferably set at 80 to 100° C. and more preferably set at 90 to 100° C. The reaction time of the aqueous solution method may be set at a time in which a uniform aqueous solution is prepared; however, the reaction time is preferably set at 0.1 to 3 hours and more preferably set at 0.1 to 2 hours from the time at which the reaction temperature is reached.

In the aqueous solution method, by cooling the aqueous solution after the reaction, the nylon salt can be precipitated in the aqueous solution and thus the nylon salt can be obtained.

The liquid method is a method for producing a nylon salt by preparing a liquid mixture by mixing a dicarboxylic acid and a diamine and producing the nylon salt from the liquid mixture.

In the liquid method, first, at a temperature equal to or higher than the melting point of the diamine, the dicarboxylic acid and the diamine are mixed to yield the liquid mixture. In this case, by setting the mixing temperature at a temperature equal to or higher than the melting point of the diamine, the dicarboxylic acid is dispersed in the diamine as a solvent in the liquid mixture, or alternatively, a state occurs in which the dicarboxylic acid and the diamine are mixed in liquid form with each other.

The mixing time in the liquid method is preferably set at 0.1 to 2 hours and more preferably set at 0.1 to 1.0 hour from the time at which the reaction temperature is reached.

By stirring the obtained liquid mixture at a temperature lower than the melting point of the produced polyamide resin, the dicarboxylic acid and the diamine are allowed to react with each other and thus the nylon salt is obtained.

The reaction temperature in the liquid method is desirably set at a low temperature so as to suppress the successive polymerization of the produced salt, preferably set at a temperature lower than the melting point of the produced polyamide resin and more preferably set at 270° C. or lower, From the viewpoint of sufficiently performing the production of the salt, the reaction time in the liquid method is preferably set at 0.1 to 10 hours and more preferably set at 0.1 to 5 hours from the time at which the reaction temperature is reached. Such a reaction as described above may be performed either under normal pressure or under pressurized conditions.

In the aqueous solution method or the liquid method, the nylon salt may be polymerized in a condition containing water, or in a condition of being in dried powder form. Examples of a method for drying and powderizing the water-containing nylon salt include a drying method using a vacuum dryer and a spray drying method.

In the aqueous solution method or the liquid method, the nylon salt maintaining the condition of being in powder form can be obtained by crushing the produced nylon salt. In the nylon salt maintaining the condition of being in powder form, lower polymers produced by polymerization of a fraction of the nylon salt may also be included.

The solid method is a method for producing a nylon salt by adding the diamine in a certain proportion to the heated dicarboxylic acid powder and by thus allowing the dicarboxylic acid and the diamine to react with each other while the condition of being in powder form of the dicarboxylic acid is being maintained.

From the viewpoint of maintaining the condition of being in powder form, the heating temperature of the dicarboxylic acid in the solid method is preferably set at a temperature equal to or higher than the melting point of the diamine and equal to or lower than the melting point of the dicarboxylic acid. From the viewpoint of maintaining the condition of being in powder form of the dicarboxylic acid, the reaction time in the solid method is preferably set at 0 to 6 hours and more preferably set at 0.25 to 3 hours from the completion of the addition of the diamine.

The method for adding the diamine in the solid method is not particularly limited as long as the addition method allows the dicarboxylic acid to maintain the condition of being in powder form. Among the addition methods, from the viewpoint of suppressing the agglomeration of the obtained nylon salt and thus efficiently performing the formation reaction of the nylon salt while the dicarboxylic acid is maintaining the condition of being in powder form, for example, the following methods are preferable: a method in which the diamine is continuously added by using, for example, a feeder, or a method in which the diamine is intermittently added (a method repeating the addition periodically) in a divided manner in an appropriate amount at a time (for example, at a time, in $\frac{1}{10}$ to $\frac{1}{100}$ the total amount of the diamine to be added). Alternatively, a method based on a combination of the foregoing methods may also be adopted. The feeder is also not particularly limited, and heretofore known feeders can be used.

In the method for producing a polyamide resin of the present invention, such a nylon salt as described above is required to be heated under normal pressure while water vapor is being allowed to be present in the reaction system. Because the boiling point of the diamine included in the nylon salt is 100° C. or higher, when the reaction system is heated, water is gasified in preference to the diamine, and the diamine is not distilled outside the reaction system. The presence of water vapor in the reaction system allows the volatilized diamine to be refluxed with water vapor, and hence the diamine is not distilled outside the reaction system. Consequently, the molar balance between the dicarboxylic acid and the diamine included in the nylon salt is not lost, and thus the nylon salt is allowed to easily achieve a high molecular weight. "Normal pressure" as referred to herein means that the pressure inside the reaction vessel is substantially the same as the atmospheric pressure in the environment where the reaction vessel is placed, and specifically means that [(atmospheric pressure)−(pressure inside reaction vessel)] is approximately ±0.01 MPa.

Examples of the method for allowing water vapor to be present in the reaction system include the following methods: a method in which water vapor is allowed to be present, for example, by beforehand adding water to the reaction vessel in advance of the heating; and a method in which water vapor is directly made to flow in the reaction system from before the start of the heating. These methods may also be used in combination. The adoption of these methods enables water vapor to be present in the reaction system from immediately after the start of the heating, and accordingly, when the nylon salt is heated, the distillation of the diamine isolated from the nylon salt outside the reaction system can be suppressed, and hence a polyamide resin having a high molecular weight can be produced. The occurrence or nonoccurrence of the distillation of the diamine outside the reaction system can be verified by comparing the molar ratios between the dicarboxylic acid and the diamine in the obtained polyamide resin. In the present invention, when the foregoing molar ratio in the polyamide resin is 50/50 to 55/45, it is taken that the molar balance is maintained.

In the case where water is beforehand added to the reaction vessel in advance of the heating, the addition amount of water is preferably set at 0.5 to 10 parts by mass and more preferably set at 0.5 to 5 parts by mass in relation to 100 parts by mass of the nylon salt. The addition amount of water set so as to fall within a range from 0.5 to 10 parts by mass enables the suppression of the by-production of triamine while the volatilization of the diamine is being efficiently suppressed. When the addition amount of water is less than 0.5 part by mass, immediately after the heating, the amount of water vapor in the reaction system is small and accordingly the diamine is sometimes distilled outside the reaction system. On the other hand, when the addition amount of water exceeds 10 parts by mass, the nylon salt partially dissolved in water and the triamine tends to be by-produced when the nylon salt is polymerized.

In the case where water vapor is made to flow directly in the reaction system from before the start of the heating, the flow rate of water vapor is different depending on the inner capacity of the reaction vessel; for example, when the inner capacity is about 30 L, the flow rate of water vapor is preferably set at 0.2 to 1.0 g/min and more preferably 0.3 to 0.8 g/min.

In the production method of the present invention, water is produced as the polymerization proceeds, and the produced amount of water is increased or decreased depending on the progress of the polymerization reaction. In the present invention, in the first half of the polymerization being high in the possibility of the volatilization of the diamine, the molar fraction of water vapor in the atmosphere inside the reaction vessel is preferably set at 10% or more and more preferably 20 to 90%. Here, the first half of the polymerization means the time range where the terminal reaction percentage is approximately 85% or less. The molar fraction of water vapor is, as described later, derived from the molar quantity of water and the molar quantity of the inert gas distilled per unit time. By setting the molar fraction of water vapor at 10% or more, even when the diamine is gasified in the reaction system, the diamine is refluxed together with water, and hence without distilling the diamine outside the reaction system, only water can be distilled outside the reaction system. On the other hand, in the case where no inert gas is introduced, the proportion of water vapor becomes 100%, but when the distillation amount of water is decreased as the polymerization proceeds, there is a possibility that external air is mixed in the reaction system.

For the purpose of controlling the molar fraction of water vapor in the reaction vessel so as to fall within the foregoing range, the water produced by the polymerization reaction is preferably partially distilled outside the reaction system while water is being refluxed. In the case where no refluxing is performed, even when water is beforehand added to the reaction vessel in advance of the heating, the water vapor in the reaction vessel is completely distilled depending on the size of the reaction vessel or the flow rate of the inert gas, sometimes substantially no water vapor is present in the reaction vessel at the start of the polymerization, and in such a case, the distillation of the diamine cannot be suppressed. For the purpose of distilling a fraction of water outside the reaction system while water is being refluxed, for example, the reaction vessel may be provided with a reflux apparatus such as a reflux tube or a reflux tower. In such a case, for example, the length, the cross section or the temperature of the reflux apparatus can be appropriately selected.

For example, the length of the reflux apparatus, the cross-sectional shape of the reflux apparatus and the temperature of the reflux apparatus in the present invention are not particularly limited, and can be appropriately selected from the optional ones.

The polymerization temperature is preferably set at 180 to 320° C. and more preferably set at 200 to 270° C. The polymerization temperature set at 180 to 320° C. enables the efficient progress of the polymerization reaction while the side reaction producing the by-product such as triamine and the degradation of the polymer are being suppressed. Specifically, when the polymerization temperature is lower than 180° C., the polymerization rate sometimes becomes too slow. On the other hand, when the polymerization temperature exceeds 320° C., the effects of the side reaction are developed to increase the amount of the triamine and to result in a polyamide resin, for example, abundant in gel.

The polymerization time is preferably set at 0.5 to 72 hours and more preferably set at 1 to 36 hours. When the polymerization time is less than 0.5 hour, the polymerization reaction sometimes becomes insufficient. On the other hand, when the polymerization time exceeds 72 hours, the amount of the triamine, a by-product, is increased as described above, and a polyamide resin, for example, abundant in gel is sometimes obtained.

In the production method of the present invention, as described above, water is distilled outside the reaction system from the start to the end of the polymerization. Herewith, the hydrolysis reaction of the produced polyamide resin is suppressed, and the production of the polyamide resin is promoted. Consequently, the polymerization time is reduced, the amount of the triamine, a by-product, is suppressed in the obtained polyamide resin, and the occurrence of, for example, gel can be suppressed. More specifically, the polyamide resin obtained by the production method of the present invention allows the amount of the triamine in the polyamide resin to be as small as 0.3 mol % or less in relation to the amount of the diamine.

In the production method of the present invention, for the purpose of preventing the degradation of the contents in the reaction vessel due to the mixing of the oxygen outside the reaction system, it is preferable to make an inert gas to flow in the reaction vessel. However, when the flow rate of the inert gas is too large, water is not sometimes refluxed, and hence it is preferable to appropriately regulate the flow rate of the inert gas according to the progress of the reaction.

The flow rate of the inert gas in the reaction vessel is preferably set at 0.01 to 1 L/min from the viewpoint of maintaining the water vapor atmosphere. When the terminal reaction percentage reaches 85 to 99%, the generation of water due to the polymerization reaction becomes small. In such a case, the flow rate of the inert gas in the reaction vessel may be changed over to 0.01 to 10 L/min. The flow rate of the inert gas is a value at 25° C. and normal pressure.

In the method for producing a polyamide resin of the present invention, either of the melt polymerization method and the solid phase polymerization method may be adopted for the purpose of polymerizing the nylon salt. In the case of the solid phase polymerization method, the nylon salt is preferably made to have a granular form or a powder form from the viewpoint of promoting the progress of the polymerization.

In the production method of the present invention, a catalyst is preferably used from the viewpoint of improving the polymerization rate. Examples of such a catalyst include phosphoric acid, phosphorous acid, hypophosphorous acid and the salts of these. These catalysts may be used each alone or in combinations of two or more thereof. The amount used of the catalyst may be of the order of an amount used in common polymerization of nylon, and is preferably 2 mol % or less in relation to the total number of moles of the dicarboxylic acid and the diamine.

In the production method of the present invention, a terminal blocking agent may also be used, for example, for the purpose of regulating the degree of polymerization, and suppressing the decomposition or the coloration. Examples of the terminal blocking agent include monocarboxylic acids and monoamines. Examples of the monocarboxylic acid include acetic acid, lauric acid and benzoic acid; examples of the monoamine include octylamine, cyclohexylamine and aniline. These may be used each alone or in combinations of two or more thereof. The addition amount of the terminal blocking agent may be of the order of an amount used in common polymerization of nylon, and is preferably 5 mol % or less in relation to the total number of moles of the dicarboxylic acid and the diamine.

The relative viscosity of the polyamide resin produced by using the production method of the present invention is appropriately set according to the intended purpose; when a polyamide easy to mold-process is intended to be obtained, the relative viscosity is preferably set at 1.8 or more and more preferably set at 2.0 or more.

To the polyamide resin obtained by the production method of the present invention, the additives such as an antioxidant, an antistatic agent, a flame retardant, a flame retardant aid, a thermal stabilizer, a fibrous reinforcing agent, a filler and a pigment may also be added. Examples of the fibrous reinforcing agent include glass fiber and carbon fiber. Examples of the filler include talc, swelling clay minerals, silica, alumina, glass beads and graphite. Examples of the pigment include titanium oxide and carbon black.

In the production method of the present invention, if necessary, lactams such as caprolactam may be copolymerized with the polyamide resin. In the case where lactams are copolymerized, the copolymerization proportion of the lactams is preferably set at 30 mol % or less and more preferably set at 20 mol % or less in relation to the total amount of the dicarboxylic acid and the diamine. For the purpose of copolymerizing the lactams, for example, a technique to copolymerize after the lactams are added to the nylon salt is adopted.

The polyamide resin obtained by the production method of the present invention can be processed into various molded articles, film, sheet and fiber, by heretofore known molding methods such as injection molding, extrusion molding and blow molding, or by heretofore known film formation methods and spinning methods.

These molded articles, film and fiber can be preferably used in various applications, as industrial materials and engineering materials such as electric•electronic components, automobile components and business machine components, or household articles.

EXAMPLES

Hereinafter, the present invention is more specifically described with reference to Examples. The present invention is not limited to following Examples.

The starting materials used in Examples and Comparative Examples are as follows.

(1) Dicarboxylic Acids

Terephthalic acid (powder having a volume average particle size of 80 μm)

Isophthalic acid (powder having a volume average particle size of 100 μm)

(2) Diamines 1,9-Diaminononane (boiling point: 258° C.)

1,10-Diaminodecane (boiling point: 271° C.)

1,12-Diaminododecane (boiling point: 304° C.)

(3) AH Salt

Nylon salt including equimolar amounts of adipic acid and 1,6-diaminohexane (4) Other Additives Sodium hypophosphite monohydrate Benzoic acid The evaluation methods used in Examples and Comparative Example are as follows.

(1) Molar Fraction of Water Vapor in Reaction Vessel

The molar fraction of water vapor in the reaction vessel was derived from the molar quantity of water and the amount of the inert gas distilled per unit time on the basis of the following formula.

Molar fraction of water vapor in reaction vessel=100× $A/(A+B)$

A: The amount (mol) of water distilled per unit time

B: The amount (mol) of the inert gas introduced per unit time

The distilled amount of water was determined from the mass of the water obtained by recondensation with a condenser of the water vapor discharged from the reaction vessel. The amount of the inert gas was determined from the flow rate of the inert gas.

(2) Relative Viscosity

The polyamide resin was dissolved in sulfuric acid (concentration: 96% by mass) as a solvent, to prepare a sample solution having a concentration of 1 g/dL. Successively, by using an Ubbelohde viscometer, the falling time of the sample solution and the falling time of the solvent were measured at a temperature of 25° C. Then, by using the following formula, the relative viscosity was determined. Relative viscosity= (falling time of sample solution)/(falling time of only solvent)

(3) Melting Point

By using a differential scanning calorimeter (DSC-7, manufactured by Perkin-Elmer Corp.), 10 mg of polyamide resin was increased in temperature from normal temperature to 350° C. at a rate of 20° C./min, and maintained at 350° C. for 5 minutes. Subsequently, the polyamide resin was cooled to 25° C. at a rate of 500° C./min, maintained at 25° C. for 5 minutes, and then increased in temperature to 400° C. at a rate of 20° C./min. The temperature corresponding to the top of the peak due to the melting of the curve obtained at the time of the second temperature increase was taken as the melting point temperature.

(4) Amount of Triamine of Polyamide Resin

To 10 mg of the polyamide resin, 3 mL of hydrobromic acid (concentration: 47% by mass) was added and heated at 130° C. for 16 hours, and then the resulting solution was allowed to cool to room temperature. To the solution, 5 mL of an aqueous solution of sodium hydroxide (concentration: 20% by mass) was added to alkalize the sample solution. Then, the sample solution was transferred to a separating funnel, 8 mL of chloroform was added to the sample solution, the sample solution was stirred and then allowed to stand still, and then the chloroform phase was collected and concentrated. To the concentrated chloroform solution, 1.5 mL of chloroform was added, and the resulting solution was filtered with a membrane filter and the resulting filtrate was used as the measurement sample. The measurement sample was analyzed with a gas chromatograph (trade name: Agilent 6890N, manufactured by Agilent Technologies, Inc.) equipped with a mass spectrometer. Specifically, by using the calibration curves prepared by using the diamine and the triamine as the standard samples, the diamine and the triamine in the polyamide resin were quantitatively determined, and thus the molar ratio of the triamine to the diamine was derived. As the standard substance of the diamine, the diamine used for the polymerization was used. As the standard substance of the triamine, the triamine compound was used which was obtained by allowing the diamine used for the polymerization to react by heating under stirring the diamine used for the polymerization, by using palladium oxide as a catalyst, in an autoclave at 240° C. for 3 hours.

(5) Volume Average Particle Size of Powder

The volume average particle size of a powder was measured by using a laser diffraction/scattering particle size distribution analyzer (LA920, manufactured by Horiba, Ltd.).

(6) Molar Ratio Between Dicarboxylic Acid and Diamine, and Terminal Reaction Percentage The polyamide resin was subjected to a $^1$H-NMR analysis by using a high-resolution nuclear magnetic resonance apparatus (ECA500 NMR, manufactured by JEOL Ltd.), and the molar ratio between the dicarboxylic acid and the diamine, and the proportion of the terminals, of the whole terminals, becoming amide bonds due to reaction were determined. The analysis conditions were as follows.

Resolution: 500 MHz

Solvent: Deuterated trifluoroacetic acid

Temperature: 25° C.

Example 1

[Polymerization]

To a reaction vessel equipped with a double helical blade, having an inner capacity of 30 L, 10.0 kg of the AH salt and 200 g of water were fed, and were melt-polymerized at 275° C. for 2 hours. The polymerization was performed under normal pressure, while nitrogen was made to flow at a flow rate of 4 L/min, and water was being refluxed into the reaction system, wherein water was distilled outside the reaction system. The reaction vessel used was equipped with a condenser of 8 cm in inner diameter and 35 cm in height, and the temperature inside the condenser was controlled to 80 to 85° C. During the polymerization, the molar concentration of water vapor in the reaction vessel was maintained at 60 to 90%.

After the progress of the polymerization, the terminal reaction percentage was verified to be 95%, the flow rate of nitrogen was changed over to 20 L/min, the polymerization was performed further for 1 hour, and thus a polyamide resin (polyamide 66) was obtained. The polyamide resin was extruded from the reaction vessel with nitrogen pressure, and was pelletized by using a strand cutter.

In the obtained polyamide 66, the molar ratio between adipic acid and 1,6-diaminohexane was 50/50.

Example 2

[Preparation of Nylon Salt (Aqueous Solution Method)]

Under normal pressure, at 97° C., 1473 g of terephthalic acid, 1527 g of 1,10-diaminodecane (terephthalic acid:1,10-diaminodecane=50:50 (molar ratio)) and 100 kg of water were allowed to react with each other for 1 hour. Subsequently, the reaction solution was cooled to 25° C. to precipitate a nylon salt; the precipitated nylon salt was vacuum-dried at 120° C. for 12 hours to yield a powder of the nylon salt.

[Polymerization]

To a reaction vessel equipped with a double helical blade, having an inner capacity of 8 L, 2850 g of the nylon salt obtained as described above, 0.89 g of sodium hypophosphite monohydrate, 10.28 g of benzoic acid and 100 g of water were fed, and the resulting reaction mixture was subjected to solid phase polymerization at 240° C. for 5 hours. The polymerization was performed under normal pressure while nitrogen was being made to flow at a flow rate of 2 L/min and water was being distilled outside the reaction system under refluxing. The reaction vessel used was equipped with a condenser of 4 cm in inner diameter and 10 cm in height, and the temperature inside the condenser was controlled to 80 to 85° C.

After the progress of the polymerization, the terminal reaction percentage was verified to be 99%, the flow rate of nitrogen was not changed over, the polymerization was performed further for 2 hours, and thus a polyamide resin powder (polyamide 10T) was obtained. In the obtained polyamide 10T, the molar ratio between terephthalic acid and 1,10-diaminodecane was 50/50.

Example 3

[Preparation of Nylon Salt (Solid Method)]

To a reaction vessel equipped with a double helical type stirring blade, having an inner capacity of 8 L, 982 g of terephthalic acid was fed, and heated to 165° C. under sealing with nitrogen while stirring at a number of rotations of 60 rpm. Subsequently, while the temperature of 165° C. was being maintained, to the terephthalic acid powder, 1018 g of 1,10-diaminodecane was added every 5 minutes, 36 separate times, in an amount of 28.3 g (2.8% by mass of the total amount of the diamine) at a time (terephthalic acid:1,10-diaminodecane=50:50 (molar ratio)). The stirring was continued at 165° C. further for 1 hour, and thus a nylon salt powder was obtained.

[Polymerization]

The inside of the reaction vessel containing the nylon salt powder was cooled to 40° C. and 40 g of water was added to the reaction vessel. Subsequently, the resulting mixture was heated, and the nylon salt was subjected to solid phase polymerization at 240° C. for 5 hours. The polymerization was performed under normal pressure while nitrogen was being made to flow at a flow rate of 2 L/min and water was being distilled outside the reaction system under refluxing. The reaction vessel used was equipped with a condenser of 4 cm in inner diameter and 10 cm in height, and the temperature inside the condenser was controlled to 80 to 85° C. After the progress of the polymerization, the terminal reaction percentage was verified to be 99%, the polymerization was performed further for 2 hours, and thus a polyamide resin powder (polyamide 10T) was obtained.

Examples 4 to 8

In each of Examples 4 to 8, a polyamide resin powder (polyamide 10T) was obtained by preparing a nylon salt and subsequently polymerizing the nylon salt in the same manner as in Example 3 except that the amount of water added in the polymerization step was altered as shown in Table 1.

Example 9

[Preparation of Nylon Salt (Solid Method)]

A nylon salt was prepared by performing the same operations as in the preparation of the nylon salt in Example 3.

[Polymerization]

While blowing nitrogen at a flow rate of 2 L/min and 0.7 MPa-saturated water vapor at a flow rate of 0.5 g/min into the reaction vessel remaining to contain the nylon salt, the temperature inside the reaction vessel was increased to 240° C. over 1 hour. After the temperature reached 240° C., while the flow rates of nitrogen and water vapor were being maintained, the solid phase polymerization of the nylon salt was performed at 240° C. for 3 hours.

Subsequently, the feeding of water vapor was terminated, and the solid phase polymerization was performed further for 2 hours. The polymerization was performed under normal pressure while water was being distilled outside the reaction system under refluxing. The reaction vessel used was equipped with a condenser of 4 cm in inner diameter and 10 cm in height, and the temperature inside the condenser was controlled to 80 to 85° C. After the progress of the polymerization, the terminal reaction percentage was verified to be 99%, the polymerization was performed further for 2 hours, and thus a polyamide resin powder (polyamide 10T) was obtained.

Example 10

[Preparation of Nylon Salt (Aqueous Solution Method)]

Under normal pressure at 97° C. for 1 hour, 1031 g of terephthalic acid, 442 g of isophthalic acid, 1527 g of 1,10-diaminodecane (terephthalic acid:isophthalic acid:1,10-diaminodecane=35:15:50 (molar ratio)) and 100 kg of water were allowed to react with each other. Subsequently, the reaction solution was cooled to 25° C. to precipitate a nylon salt; the precipitated nylon salt was vacuum-dried at 120° C. for 12 hours to yield a powder of the nylon salt.

[Polymerization]

A polyamide resin powder (polyamide 10TI) was obtained by performing the same operations as in the polymerization in Example 2.

Example 11

[Preparation of Nylon Salt (Solid Method)]

To a reaction vessel equipped with a double helical type stirring blade, having an inner capacity of 8 L, 1024 g of terephthalic acid was fed, and heated to 160° C. under sealing with nitrogen while stirring at a number of rotations of 60 rpm. Subsequently, while the temperature of 160° C. was being maintained, to the terephthalic acid powder, 976 g of 1,9-diaminononane was added every 5 minutes, 36 separate times, in an amount of 27.1 g (2.8% by mass of the total amount of the diamine) at a time (terephthalic acid: 1,9-diaminononane=50:50 (molar ratio)). The stirring was continued at 160° C. further for 1 hour, and thus a nylon salt powder was obtained.

[Polymerization]

The temperature inside the reaction vessel remaining to contain the nylon salt was cooled to 40° C. and 40 g of water was added to the reaction vessel. Subsequently, the resulting mixture was heated, and the nylon salt was subjected to solid phase polymerization at 240° C. for 5 hours. The polymerization was performed under normal pressure while nitrogen was being made to flow at a flow rate of 2 L/min and water was being distilled outside the reaction system under refluxing.

The reaction vessel used was equipped with a condenser of 4 cm in inner diameter and 10 cm in height, and the temperature inside the condenser was controlled to 80 to 85° C. After the progress of the polymerization, the terminal reaction percentage was verified to be 99%, the polymerization was performed further for 2 hours, and thus a polyamide resin powder (polyamide 9T) was obtained.

Example 12

[Preparation of Nylon Salt (Solid Method)]

To a reaction vessel equipped with a double helical type stirring blade, having an inner capacity of 8 L, 907 g of terephthalic acid was fed, and heated to 160° C. under sealing with nitrogen while stirring at a number of rotations of 60 rpm. Subsequently, while the temperature of 160° C. was being maintained, to the terephthalic acid powder, 1093 g of 1,12-diaminododecane was added every 5 minutes, 36 separate times, in an amount of 30.4 g (2.8% by mass of the total amount of the diamine) at a time (terephthalic acid:1,12-diaminododecane=50:50 (molar ratio)). The stirring was continued at 160° C. further for 1 hour, and thus a nylon salt powder was obtained.

[Polymerization]

The temperature inside the reaction vessel remaining to contain the nylon salt was cooled to 40° C. and 40 g of water was added to the reaction vessel. Subsequently, the resulting mixture was heated, and the nylon salt was subjected to solid phase polymerization at 240° C. for 5 hours. The polymerization was performed under normal pressure while nitrogen was being made to flow at a flow rate of 2 L/min and water was being distilled outside the reaction system under refluxing. The reaction vessel used was equipped with a condenser of 4 cm in inner diameter and 10 cm in height, and the temperature inside the condenser was controlled to 80 to 85° C. After the progress of the polymerization, the terminal reaction percentage was verified to be 99%, the polymerization was performed further for 2 hours, and thus a polyamide resin powder (polyamide 12T) was obtained.

Comparative Example 1

[Polymerization]

To an autoclave equipped with a double helical blade, having an inner capacity of 30 L, 10.0 kg of the AH salt and 5.0 kg of water were fed. Next, after the internal atmosphere of the autoclave was replaced with nitrogen, the internal pressure of the autoclave was regulated to 1.5 MPa (namely, under pressurized condition) under sealing, and the AH salt was melt-polymerized at 275° C. for 3 hours.

The inside of the autoclave was made to get back to normal pressure, the terminal reaction percentage was verified to be 90%, and then, polymerization was performed in a flow of nitrogen gas at a flow rate of 20 L/min, further for 1 hour to yield a polyamide resin (polyamide 66). The polyamide resin obtained was extruded from the autoclave with nitrogen pressure, and was pelletized by using a strand cutter.

Comparative Example 2

[Polymerization]

To a reaction vessel equipped with a double helical blade, having an inner capacity of 30 L, 10.0 kg of a nylon salt including equimolar amounts of adipic acid and 1,6-diaminohexane and 200 g of water were fed, and the nylon salt was melt-polymerized at 275° C. for 2 hours. The polymerization was performed under normal pressure while nitrogen was made to flow at a flow rate of 40 L/min, without refluxing. After the progress of the polymerization, the terminal reaction percentage was verified to be 95%, the polymerization was performed further for 1 hours, and thus a polyamide resin (polyamide 66) was obtained. The obtained polyamide resin was extruded from the reaction vessel with nitrogen pressure.

Comparative Example 3

A polyamide resin was obtained by performing the same operations as in Example 3 except that no water was added in the step of [polymerization].

Table 1 shows the production conditions in Examples 1 to 12 and the values of the properties of the polyamide resins obtained in Examples 1 to 12. Table 2 shows the production conditions in Comparative Examples 1 to 3 and the values of the properties of the polyamide resins obtained in Comparative Examples 1 to 3.

TABLE 1

| | | | Examples | | | | | | | | | | | | |
|---|---|---|---|---|---|---|---|---|---|---|---|---|---|---|---|
| | | | 1 | 2 | 3 | 4 | 5 | 6 | 7 | 8 | 9 | 10 | 11 | 12 |
| Starting materials | | | HA AA | DA TPA | DA TPA | DA TPA | DA TPA | DA TPA | DA TPA | DA TPA | DA TPA | DA TPA/IPA | NA TPA | DDA TPA |
| Production conditions | Reaction temperature | °C. | 275 | 240 | 240 | 240 | 240 | 240 | 240 | 240 | 240 | 240 | 240 | 240 |
| | Pressure | | Normal pressure | Normal pressure | Normal pressure | Normal pressure | Normal pressure | Normal pressure | Normal pressure | Normal pressure | Normal pressure | Normal pressure | Normal pressure | Normal pressure |
| | Addition amount of water | parts by mass | 2 | 3.5 | 2 | 0 | 0.4 | 12 | 0.5 | 10 | — | 3.5 | 2 | 2 |
| | Water vapor made to flow | g/min | — | — | — | — | — | — | — | — | 0.5 | — | — | — |
| | Amount of added water or water vapor/volume of reaction vessel | g/L | 6.67 | 12.5 | 5 | 0 | 1 | 30 | 1.25 | 25 | 15 | 12.5 | 5 | 5 |
| | Application or nonapplication of reflux | | Applied | Applied | Applied | Applied | Applied | Applied | Applied | Applied | Applied | Applied | Applied | Applied |

TABLE 1-continued

| | | | Examples | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 | 12 |
| | Water distillation outside reaction system | | Applied | Applied | Applied | Applied | Applied | Applied | Applied | Applied | Applied | Applied | Applied | Applied |
| | Flow rate of inert gas | L/min | 4 | 2 | 2 | 2 | 2 | 2 | 2 | 2 | 2 | 2 | 2 | 5 |
| | Molar fraction of water vapor in reaction vessel | % | 60-90 | 30-65 | 20-50 | 5-50 | 15-50 | 20-70 | 15-50 | 20-65 | 20-60 | 30-65 | 20-55 | 20-50 |
| | Polymerization time | hr | 2 | 5 | 5 | 5 | 5 | 5.5 | 5 | 5 | 5 | 5 | 5 | 5 |
| Values of properties | Relative viscosity | | 2.55 | 2.78 | 2.50 | 1.95 | 2.26 | 2.46 | 2.31 | 2.48 | 2.57 | 2.66 | 2.41 | 2.47 |
| | Melting point | °C. | 262 | 316 | 316 | 317 | 317 | 316 | 316 | 316 | 317 | 269 | 307 | 299 |
| | Amount of triamine | mol % | 0.08 | 0.13 | 0.13 | 0.11 | 0.12 | 0.25 | 0.12 | 0.18 | 0.14 | 0.11 | 0.13 | 0.17 |

TABLE 2

| | | | Comparative Examples | | |
|---|---|---|---|---|---|
| | | | 1 | 2 | 3 |
| | Starting materials | | HA AA | HA AA | DA TPA |
| Production conditions | Reaction temperature | °C. | 275 | 275 | 240 |
| | Pressure | | Pressurized (1.5 MPa) | Normal pressure | Normal pressure |
| | Addition amount of water | parts by mass | 50 | 2 | 0 |
| | Amount of added water or water vapor/volume of reaction vessel | g/L | 167 | 6.67 | 0 |
| | Application or nonapplication of reflux | | Not applied | Not applied | Not applied |
| | Water distillation outside reaction system | | Not applied | Applied | Applied |
| | Flow rate of inert gas | L/min | — | 40 | 40 |
| | Molar fraction of water vapor in reaction vessel | % | — | 5-25 | 5-20 |
| | Polymerization time | hr | 3 | 2 | 5 |
| Values of properties | Relative viscosity | | 2.31 | 1.67 | 1.40 |
| | Melting point | °C. | 261 | 258 | 314 |
| | Amount of triamine | mol % | 0.31 | 0.05 | 0.10 |

In Tables 1 and 2, the addition amounts of water represent the proportions of water in relation to 100 parts by mass of the nylon salt, and the abbreviations represent the following.

HA: 1,6-Diaminohexane
NA: 1,9-Diaminononane
DA: 1,10-Diaminodecane
DDA: 1,12-Diaminododecane
AA: Adipic acid
TPA: Terephthalic acid
IPA: Isophthalic acid In any of Examples 1 to 12, the polymerization was performed under normal pressure, while water was partially distilled outside the reaction system under refluxing, and hence the polyamide resin was able to efficiently achieve a high molecular weight. Accordingly, in any of Examples 1 to 12, as compared to Comparative Example 1 where the polymerization was performed under pressurized conditions, the polymerization time was shorter and the amount of the triamine was smaller.

In each of Examples 1 and 2, the molar ratio between the dicarboxylic acid and the diamine was 50/50 both in the starting material such as the nylon salt and in the obtained polyamide resin, and hence it is concluded that the diamine was not substantially distilled outside the reaction system.

In each of Examples 2, 3 and 8, the polymerization between terephthalic acid and 1,10-diaminodecane was performed by beforehand adding 0.5 to 10 parts by mass of water, in advance of the polymerization, in the reaction vessel in relation to 100 parts by mass of the nylon salt. Accordingly, from the start of the polymerization, the reaction vessel was in a condition of being sufficiently filled with water vapor. Consequently, the polyamide resin obtained in each of Examples 2, 3 and 8 was higher in relative viscosity than the polyamide resin obtained in each of Examples 4 and 5 smaller in the addition amount of water than the amount specified in the present invention. Additionally, the polyamide resin obtained in each of Examples 2, 3 and 8 was smaller in the amount of the triamine than the polyamide resin obtained in Example 6 larger in the addition amount of water than the amount specified in the present invention.

In Example 9, the polymerization was performed by making water vapor flow directly in the reaction system from before the start of the heating. Accordingly, from the start of the polymerization, the reaction vessel was in a condition of being sufficiently filled with water vapor. Consequently, the obtained polyamide resin was higher in relative viscosity and smaller in the amount of the triamine.

In Comparative Example 1, a polyamide resin was polymerized under pressurized conditions. Accordingly, the polymerization time was longer and the amount of the triamine in the obtained polyamide resin was larger in Comparative Example 1 than in Example 1.

In Comparative Example 2, water was not refluxed into the polymerization reaction system, hence water vapor was wholly distilled outside the polymerization reaction system, thus no water vapor was present in the reaction system at the start of the polymerization, and hence the diamine was partially distilled outside the reaction system. Consequently, in the obtained polyamide resin, no high molecular weight was achieved and the relative viscosity was low.

In Comparative Example 3, the polymerization was performed without adding any water and additionally without refluxing water into the polymerization reaction system, hence the amount of water vapor in the reaction system at the start of the polymerization was small, and the diamine was partially distilled outside the reaction system. Consequently, in the obtained polyamide resin, no high molecular weight was achieved and the relative viscosity was low.

Industrial Applicability

The method for producing a polyamide resin of the present invention performs the polymerization under normal pressure, accordingly reduces the polymerization time as compared to the case where the polymerization is performed under pressurized conditions, and makes it possible to obtain a polyamide resin being small in the amount of the triamine to be a cause for gelation and having a high molecular weight. The production method of the present invention also requires no pressurization device, accordingly the costs for the introduction and the operation and maintenance of the apparatus are low, and hence is extremely useful.

The invention claimed is:

1. A method for producing a polyamide resin wherein a nylon salt obtained from a dicarboxylic acid and a diamine having a boiling point exceeding 100° C. is heated under normal pressure while water vapor is being allowed to be present in a reaction system,
   wherein at a start of a heating, 0.5 to 10 parts by mass of water in relation to 100 parts by mass of the nylon salt is allowed to be present beforehand in the reaction system.

2. The method for producing a polyamide resin according to claim 1, wherein water is distilled outside the reaction system while water is being refluxed into the reaction system.

* * * * *